(12) United States Patent
Park

(10) Patent No.: US 11,940,945 B2
(45) Date of Patent: Mar. 26, 2024

(54) RECONFIGURABLE SIMD ENGINE

(71) Applicant: CEREMORPHIC, INC., San Jose, CA (US)

(72) Inventor: Heonchul Park, Pleasanton, CA (US)

(*) Notice: Subject to any disclaimer, the term of this patent is extended or adjusted under 35 U.S.C. 154(b) by 0 days.

(21) Appl. No.: 17/566,848

(22) Filed: Dec. 31, 2021

(65) Prior Publication Data

US 2023/0214351 A1 Jul. 6, 2023

(51) Int. Cl.
*G06F 15/00* (2006.01)
*G06F 9/38* (2018.01)
*G06F 15/80* (2006.01)
*G06F 15/78* (2006.01)

(52) U.S. Cl.
CPC .......... *G06F 15/8007* (2013.01); *G06F 9/382* (2013.01); *G06F 15/7889* (2013.01)

(58) Field of Classification Search
CPC ... G06F 15/8007; G06F 9/382; G06F 15/7889
See application file for complete search history.

(56) References Cited

U.S. PATENT DOCUMENTS

| | | | | |
|---|---|---|---|---|
| 4,783,738 A * | 11/1988 | Li | ............ | G06F 9/4494 712/15 |
| 4,992,933 A * | 2/1991 | Taylor | ............ | G06F 9/3887 712/E9.035 |
| 5,230,057 A * | 7/1993 | Shido | ............ | G06F 15/8023 712/245 |
| 5,805,915 A * | 9/1998 | Wilkinson | ............ | G06F 9/3887 712/20 |
| 5,815,723 A * | 9/1998 | Wilkinson | ............ | G06F 15/17381 712/E9.055 |
| 8,144,156 B1 * | 3/2012 | Baldwin | ............ | G06F 9/3879 345/501 |
| 2006/0095716 A1 * | 5/2006 | Ramesh | ............ | G06F 9/30181 712/E9.035 |
| 2006/0174236 A1 * | 8/2006 | Stein | ............ | G06F 8/451 717/151 |
| 2008/0082797 A1 * | 4/2008 | Lo | ............ | G06F 9/3887 712/220 |
| 2012/0013627 A1 * | 1/2012 | Shah | ............ | G06F 1/3203 345/522 |

* cited by examiner

*Primary Examiner* — Corey S Faherty
(74) *Attorney, Agent, or Firm* — Jay A. Chesavage; File-EE-Patents.com

(57) ABSTRACT

An exemplary SIMD computing system comprises a SIMD processing element (SPE) configured to perform a selected operation on a portion of a processor input data word, with the operation selected by control signals read from a control memory location addressed by a decoded instruction. The SPE may comprise one or more adder, multiplier, or multiplexer coupled to the control signals. The control signals may comprise one or more bit read from the control memory. The control memory may be an M×N (M rows by N columns) memory having M possible SIMD operations and N control signals. Each instruction decoded may select an SPE operation from among N rows. A plurality of SPEs may receive the same control signals. The control memory may be rewritable, advantageously permitting customizable SIMD operations that are reconfigurable by storing in the control memory locations control signals designed to cause the SPE to perform selected operations.

20 Claims, 4 Drawing Sheets

RECONFIGURABLE SIMD ENGINE

CROSS-REFERENCE TO RELATED APPLICATIONS

None.

TECHNICAL FIELD

This disclosure relates generally to single instruction multiple data (SIMD) computing.

BACKGROUND

SIMD computing is parallel processing. A SIMD system may include multiple hardware processing elements. Each hardware processing element may be designed to perform a computing operation. The multiple hardware processing elements may be individually configured to perform a computing operation on at least a portion of an input data word. The computing operation may be an arithmetic logic unit (ALU) operation, such as, for example, addition, subtraction, multiplication, negation, or floating-point computation. The input data word may include multiple operands. The multiple processing elements may perform the same operation in parallel on the multiple operands. In an illustrative example, the multiple hardware processing elements may execute the same instruction with different operands.

SUMMARY

An exemplary SIMD computing system comprises a SIMD processing element (SPE) configured to perform a selected operation on a portion of a processor input data word, with the operation selected by control signals read from a control memory location addressed by a decoded instruction. The SPE may comprise one or more adder, multiplier, or multiplexer coupled to the control signals. The control signals may comprise one or more bit read from the control memory. The control memory may be an M×N (M rows by N columns) memory having M possible SIMD operations and N control signals. Each instruction decoded may select an SPE operation from among M rows. A plurality of SPEs may receive the same control signals. The control memory may be rewritable, advantageously permitting customizable SIMD operations that are reconfigurable by storing in the control memory locations control signals designed to cause the SPE to perform selected operations.

An example implementation in accordance with the present disclosure may comprise a SIMD engine and a control memory. The SIMD engine may comprise multiple individual SIMD processing elements (SPEs). Each individual SPE may have a control input connected to a control memory output to receive control signals read from the control memory. Each individual SPE may be designed to perform a selected ALU operation on a portion of a data word input to the SIMD engine. The selected ALU operation performed by each individual SPE may be determined as a function of the control signals. The control signals may be read from a control memory address determined as a function of a decoded processor executable instruction. The control memory may be an M×N (M rows by N columns) memory theoretically defining M possible SIMD operations with N control signals per row. Each instruction decoded may select from among M rows a SIMD operation defined by N control signals. Multiple SPEs may receive the same control signals. In some implementations all the SPEs may be configured to receive the same control signals. The control memory may be rewritable, permitting SIMD instructions to be reconfigured on demand by processor executable program instructions depending on application requirements.

In another example implementation in accordance with the present disclosure the SIMD engine may be configured to perform operations on multiple operands and multiple variables in the input data word. The SIMD engine may comprise multiple individual SPEs designed to perform operations on the multiple operands and multiple variables in parallel, increasing throughput with instructions customized for an application based on configuring the control signals in the control memory to select the desired SPE operations.

In another example implementation in accordance with the present disclosure an individual SPE may comprise one or more adder, multiplier, or multiplexer. The one or more adder, multiplier, or multiplexer may be configured in the individual SPE to perform an ALU operation on a portion of an input data word comprising one or more operand or one or more variable. The individual SPE may have a control input connected to one or more control signal read from the control memory. The one or more control signal may be operably coupled with the one or more adder, multiplier, or multiplexer to select the ALU operation performed by the individual SPE based on the one or more control signal. An individual SPE may be configured with a multiplication and adder block designed with multiple operand inputs and at least one output configured to provide a result determined by at least one adder, multiplier, and multiplexer based on at least one control signal from the control memory operably coupled with the at least one multiplexer.

In another example implementation in accordance with the present disclosure the control signals may be read from a control memory address determined as a function of a processor executable instruction decoded by a decode stage of a pipelined processor. The decode stage may be configured with logic designed to determine if an instruction is a SIMD instruction. The decode stage may be configured with logic designed to identify if an instruction is a "SIMD on" instruction to activate SIMD processing. The decode stage may be configured with logic designed to identify if an instruction is a "SIMD off" instruction to deactivate SIMD processing. The decode stage may be configured with logic designed to enable the control memory to output control signals to the SIMD engine when SIMD processing is active. The control signals may be read from a control memory location addressed by a decoded SIMD instruction.

In another example implementation in accordance with the present disclosure the SIMD engine may be configured to receive input operands and variables through an input FIFO. The input FIFO may be configured with multiple read pointers and multiple write pointers permitting an individual thread of a multiple thread application to have an individual read pointer and write pointer in the input FIFO memory dedicated to the individual thread. The input FIFO read and write pointers may increment each clock cycle. The SIMD engine may be configured to output operation results through an output FIFO. The output FIFO may be configured with multiple read pointers and multiple write pointers permitting an individual thread of a multiple thread application to have an individual read pointer and write pointer in the output FIFO memory dedicated to the individual thread. The output FIFO read and write pointers may increment each clock cycle.

In another example implementation in accordance with the present disclosure the SIMD engine and the control memory may be operably coupled with a pipelined processor decode stage. The pipelined processor decode stage may be configured with logic designed to decode SIMD instructions. The pipelined processor decode stage may be configured to output a control memory address determined by the decode stage as a function of a decoded instruction. The control memory address output by the decode stage may be operably coupled to the control memory input. Control signals may be read from the control memory locations addressed by the control memory address output by the decode stage. The control signals read from the control memory may be operably coupled with a plurality of SPEs to govern the operations performed by individual SPEs. The pipelined processor may be a superscalar processor. The superscalar processor may comprise multiple processor cores. Each processor core may be implemented using a superscalar architecture. The superscalar processor may be a RISCV processor according to the specification of https://riscv.org/technical/specifications/. The superscalar processor may be a Ceremorphic C200 processor or successor.

Various implementations may achieve one or more technical effect. For example, some implementations may improve a user's ease of implementing new or custom processor executable instructions using an existing instruction set architecture. This facilitation may be a result of configuring SIMD processing elements (SPEs) to perform an operation selected by control signals read from a rewritable control memory, permitting new instructions to be defined by changing the appropriate control signals in the memory. In some implementations, SIMD instructions may be changed programmatically during system operation, reducing a user's exposure to hardware downtime for system upgrades. Such reduced exposure to hardware downtime may be a result of a SIMD processing unit (SPU) designed to permit defining custom SIMD instructions reconfigurable based on modifying the control signals stored in a rewritable control memory. In some implementations, processor chip area available for other functions may be increased. Such increased chip area for other functions may be a result of a SIMD engine implemented using a Field Programmable Gate Array (FPGA) or similar programmable circuit package connected off-chip from a processor, freeing processor chip area that would have been used by instruction decoding logic and decoding overhead for other purposes.

In an aspect, an apparatus may comprise: at least one SIMD processing element (SPE) operably coupled with a control memory to receive from the control memory at least one control signal stored by the control memory, wherein the at least one SPE is configured to perform a selected operation on a portion of a data word, and wherein the selected operation is determined as a function of the at least one control signal read from the control memory.

The portion of the data word may further comprise at least one operand, and the at least one SPE may be configured to perform the selected operation on at least the at least one operand.

The portion of the data word may further comprise at least one variable, and the at least one SPE may be configured to perform the selected operation on at least the at least one variable.

The control memory may further comprise a plurality of memory locations, wherein at least one control signal may be stored in at least one memory location of the plurality of memory locations.

The selected operation may further comprise an arithmetic logic unit (ALU) operation.

The at least one SPE may further comprise a plurality of SPEs.

Each SPE of the plurality of SPEs may be configured to receive control signals identical to the control signals received by the other SPEs of the plurality of SPEs.

The at least one control signal received by the at least one SPE from the control memory may be read from a control memory location addressed as a function of a decoded instruction.

The apparatus may further comprise a pipelined processor having a decode stage operably coupled with the control memory, wherein the decode stage may be configured to decode an instruction received from the pipelined processor and output to the control memory a control memory address based on the decoded instruction, wherein the control memory address may comprise an address of a control memory location storing at least one control signal, and wherein the control memory may be configured to output to the at least one SPE the at least one control signal addressed in the control memory by the decoded instruction.

In another aspect, an apparatus may comprise: a SIMD engine comprising a plurality of SIMD processing elements (SPEs), wherein each SPE of the plurality of SPEs comprises a data input, a control input, and a data output, wherein each SPE is configured to provide on the data output a result of a selected arithmetic logic unit (ALU) operation on the data input, and wherein the selected ALU operation is determined as a function of the control input; a control memory having an address input and a data output, wherein the address input is operably coupled with a decode stage of a pipelined processor to receive an address determined as a function of an instruction decoded by the decode stage, wherein the control memory data output is operably coupled with the control inputs of the plurality of SPEs to provide a plurality of control signals read from the control memory to the control inputs of the plurality of SPEs; an input FIFO having a plurality of inputs configured to receive data and a plurality of outputs operably coupled with the data inputs of the plurality of SPEs; and an output FIFO having a plurality of inputs operably coupled with the data outputs of the plurality of SPEs, wherein the output FIFO has an output configured to provide an output of the SIMD engine determined as a function of individual results output by the plurality of SPEs.

At least one SPE of the plurality of SPEs may further comprise an adder and the selected ALU operation may further comprise addition.

At least one SPE of the plurality of SPEs may further comprise a multiplier and the selected ALU operation may further comprise multiplication.

At least one SPE of the plurality of SPEs may further comprise a multiplication and adder block having a plurality of operand inputs and at least one output, wherein the multiplication and adder block may be configured to provide on the at least one output a result determined by at least one multiplexer based on at least one control signal from the control memory operably coupled with the at least one multiplexer.

The decode stage may be configured to determine if an instruction is a SIMD instruction.

The decode stage may further comprise logic configured to enable the control memory to output at least one control signal to at least one SPE input in response to a determination the instruction is a SIMD instruction.

The decode stage may further comprise logic configured to enable decoding SIMD instructions in response to decoding a SIMD on instruction.

The decode stage may further comprise logic configured to disable decoding SIMD instructions in response to decoding a SIMD off instruction.

The decode stage may further comprise logic configured to disable the control memory control signal output to at least one SPE input in response to decoding the SIMD off instruction.

In another aspect, an apparatus may comprise: a SIMD engine comprising a plurality of SIMD processing elements (SPEs), wherein each SPE of the plurality of SPEs comprises a data input, a control input, and a data output, wherein each SPE is configured to provide on the data output a result of a selected arithmetic logic unit (ALU) operation on the data input, and wherein the selected ALU operation is determined as a function of the control input; a rewriteable control memory having an address input and a data output, wherein the address input is operably coupled with a decode stage of a pipelined processor to receive an address determined as a function of an instruction decoded by the decode stage, wherein the control memory data output is operably coupled with the control inputs of the plurality of SPEs to provide a plurality of control signals read from the control memory to the control inputs of the plurality of SPEs, and wherein the control memory is an M×N control memory having M rows and N columns configured to retrievably store M possible SIMD operations and N control signals; an input FIFO having a plurality of inputs configured to receive data comprising a plurality of operands, wherein the input FIFO has a plurality of outputs operably coupled with the data inputs of the plurality of SPEs, wherein the input FIFO has a plurality of per-thread read pointers and a plurality of per-thread write pointers, and wherein the input FIFO read pointers and the input FIFO write pointers are modifiable by processor executable instructions; and an output FIFO having a plurality of inputs operably coupled with the data outputs of the plurality of SPEs, wherein the output FIFO has a plurality of per-thread read pointers and a plurality of per-thread write pointers, and wherein the output FIFO read pointers and the output FIFO write pointers are modifiable by processor executable instructions, and wherein the output FIFO has an output configured to provide an output of the SIMD engine determined as a function of individual results output by the plurality of SPEs.

The SIMD engine may be internal to the pipelined processor.

The SIMD engine may be external to the pipelined processor.

The pipelined processor may further comprise a RISCV superscalar processor.

The apparatus may be configured that the control memory is writeable only in a supervisor mode.

The supervisor mode may be governed by a processor executable program instruction.

The details of various aspects are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
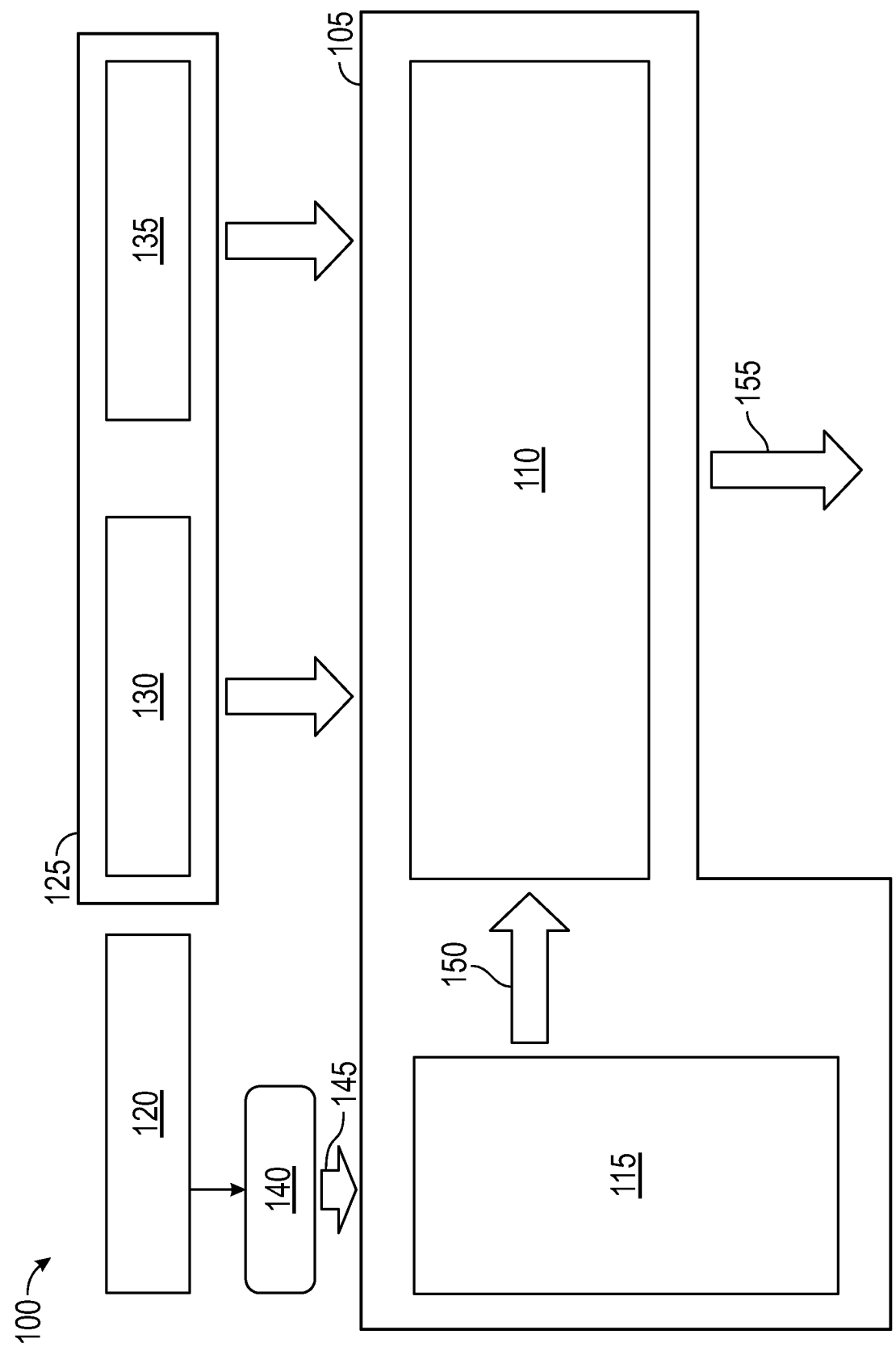
FIG. 1 depicts a data flow block diagram of an exemplary SIMD computing system implementation having a SIMD processing unit (SPU) configured with a SIMD engine comprising multiple SIMD processing element (SPE) blocks designed to perform a selected operation on a portion of a processor input data word, with the operation selected by control signals read from a control memory location addressed by a decoded instruction.

To aid understanding, this document is organized as follows. First, a hierarchical general description distinct from the description of the drawings is presented. Second, reconfigurable SIMD processing unit (SPU) design based on multiple SIMD processing element (SPE) blocks configured to perform a custom ALU operation selected by control signals read from a control memory addressed by a decoded instruction is briefly introduced with reference to FIG. 1. Third, with reference to FIGS. 2-3, the discussion turns to exemplary implementations that illustrate SIMD processing unit (SPU) component design. Specifically, exemplary SIMD processing element (SPE) and SIMD engine-based SPU implementations are presented. Finally, with reference to FIG. 4, an exemplary SIMD computing system implementation is disclosed to present improvements in SIMD technology.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features. In particular, it is noted that the respective implementation features, even those disclosed solely in combination with other implementation features, may be combined in any configuration excepting those readily apparent to the person skilled in the art as nonsensical.

The present disclosure teaches single instruction multiple data (SIMD) computing. SIMD computing may be implemented by a SIMD computing system. The SIMD computing system may comprise a SIMD processing unit (SPU). The SPU may comprise a SIMD engine. The SIMD engine may be a SIMD execution stage. The SPU may comprise a control memory. The SPU may comprise a SIMD engine and a control memory. The SIMD computing system may comprise a pipelined processor.

The SIMD engine may comprise at least one SIMD processing element (SPE). The at least one SPE may comprise a plurality of individual SPEs. An individual SPE may comprise one or more adder. The one or more adder may be a two-input adder. The one or more adder may be a three-input adder. An individual SPE may comprise one or more multiplier. The one or more multiplier may comprise a plurality of inputs each configured to receive an operand input and the one or more multiplier may be configured to provide on a multiplier output a result of a multiplication operation on the plurality of operand inputs. The one or more multiplier may be configured to multiply two operands. An individual SPE may comprise one or more multiplexer. The one or more multiplexer may be a 2:1 multiplexer. The one or more multiplexer may be a 3:1 multiplexer. The one or more multiplexer may be a 4:1 multiplexer. An individual SPE may be configured with one or more SPE control input. The one or more SPE control input may be configured to receive a control signal operably coupled with the one or more SPE control input. An individual SPE may have a data input. An individual SPE data input may be configured to receive a portion of an input data word. An individual SPE data input may be configured to receive one or more operand input with a portion of an input data word. An individual SPE data input may be configured to receive one or more variable input with a portion of an input data word. An individual SPE data input may be configured to receive one or more constant input with a portion of an input data word. An individual SPE may be configured with logic designed to control the value of the one or more constant input. An individual SPE may have a data output. An individual SPE may be configured with logic designed to receive one or more control signal coupled to the one or more SPE control input, perform an operation on data received on at least one SPE data input, and output a result of the operation on an SPE data output. A plurality of SPEs may be configured to receive identical control signals. The plurality of SPEs may be configured to execute the same operation in parallel on input data. The plurality of SPEs may be configured to execute a SIMD instruction determined as a function of the control signal values operably coupled with the individual SPE control inputs. The operation performed by an individual SPE may comprise addition. The operation performed by an individual SPE may comprise multiplication. The operation performed by an individual SPE may be selected by one or more control signal operably coupled with one or more individual SPE control input. The one or more control signal may comprise one or more control bit operably coupled with one or more individual SPE control input. The one or more control signal operably coupled with the one or more individual SPE control input may be connected to one or more multiplexer. The one or more control signal operably coupled with the one or more individual SPE control input may be connected to one or more adder. The one or more control signal operably coupled with the one or more individual SPE control input may be connected to one or more multiplier.

The control memory may be an M×N control memory. The M×N control memory may have M rows. The M×N control memory may have N columns. The control memory may store control signals. The control signals stored by the control memory may be read from the control memory. The control signals may be read from control memory locations addressed as a function of a decoded instruction. The instruction may be received from a processor pipeline. The instruction received from the processor pipeline may be decoded by a decode stage having an input operably coupled with the processor pipeline to receive an instruction to be decoded, and having an output operably coupled with a control memory input to provide a control signal address to the control memory. The control memory may comprise one or more output configured to provide one or more control signal to one or more SPE control input.

The SPU may comprise a plurality of individual SPEs. The SPU may have one or more SPU data input, one or more SPU control input, and one or more SPU data output. The one or more SPU data input may be configured to receive input data through an input FIFO. The input FIFO may be configured with a plurality of per-thread read pointers and a plurality of per-thread write pointers. The input FIFO read pointers and write pointers may be modifiable by processor executable program instructions. The SPU data input may be configured to receive a portion of an input data word comprising a plurality of operands. The SPU data input may be operably coupled to one or more individual SPE data input. The SPU control input may be operably coupled to one or more individual SPE control input. One or more individual SPE of a plurality of SPEs configured in an SPU may be configured to perform a selected operation determined by an SPU control input. The one or more individual SPE may provide a result of the selected operation on an SPE data output. The one or more SPU data output may be configured to provide an output determined as a function of a plurality of individual SPE data outputs. The one or more SPU data output may be configured to provide output data through an output FIFO. The output FIFO may be configured with a plurality of per-thread read pointers and a plurality of per-thread write pointers. The output FIFO read pointers and write pointers may be modifiable by processor executable program instructions.

The pipelined processor may comprise a decode stage. The pipelined processor decode stage may be configured to decode instructions received by the decode stage. The pipelined processor decode stage may be configured with an output operably coupled to a control memory input to provide the control memory with a control signal address determined as a function of an instruction decoded by the decode stage. The pipelined processor may be operably coupled with one or more cache. The pipelined processor may be operably coupled with one or more data cache. The pipelined processor may be operably coupled with one or more instruction cache. The pipelined processor may be operably coupled with one or more register file. The pipelined processor may be operably coupled with a data bus. The pipelined processor may be operably coupled with a data memory. The pipelined processor may be operably coupled with an instruction memory.

FIG. 1 depicts a data flow block diagram of an exemplary SIMD computing system implementation having a SIMD processing unit (SPU) configured with a SIMD engine comprising multiple SIMD processing element (SPE) blocks designed to perform a selected operation on a portion of a processor input data word, with the operation selected by control signals read from a control memory location addressed by a decoded instruction. In FIG. 1, the reconfigurable single instruction multiple data (SIMD) computing system 100 includes the SIMD processing unit (SPU) 105 comprising the SIMD engine/execution stage 110 and the SIMD control memory 115. In the depicted implementation, the SPU 105 receives the instructions 120. In the depicted implementation, the instructions 120 are processor executable program instructions. In the depicted implementation, the SPU 105 receives the input data 125. In the depicted implementation, the input data 125 comprises operand A 130 and operand B 135. In some implementations, the SPU 105 may be configured to receive more than one operand A 130. The more than one operand A 130 may be designated operand A-n 130-*n*, where n=1, 2, 3, . . . . In some implementations, the SPU 105 may be configured to receive more than one operand B 135. The more than one operand B 135 may be designated operand B-n 135-*n*, where n=1, 2, 3, . . . . The instructions 120 may be fetched from an instruction memory by a fetch stage of a pipelined processor (described with reference to FIG. 4), and then the instructions 120 may be passed to the decode stage 140. In the depicted implementation, the decode stage 140 provides the memory address 145 to the SIMD control memory 115. The decode stage 140 determines the memory address 145 based on decoding at least one of the instructions 120. In the depicted implementation the SIMD control memory 115 stores the control data 150. The control data 150 comprises control signals designed to configure the SIMD engine/execution stage 110 to perform an operation selected by the control signals on the input data 125. The control data 150 control signals read from the SIMD control memory 115 control the operation performed by the SPU 105 on operand A 130 and operand B 135. The control data 150 is read from a SIMD control memory 115 location determined as a function of the memory address 145. The SIMD engine/execution stage 110 is configured to output the SIMD engine/execution stage output data 155 result of the operation selected by the control signals. The decode stage 140 may comprise decode logic operably coupled with the SIMD control memory 115. In some implementations, if an instruction is identified by the decode stage 140 as a SIMD instruction, a control signal stored in the control memory 115 is operably coupled with the SIMD engine/execution stage 110. The instruction opcode may be used as a memory address by the SIMD control memory 115. The SIMD control memory 115 may be an M×N memory having M rows and N columns, where M is the total number of possible instructions defined for the SIMD engine/execution stage 110 and N is the number of key control signals fed to the SIMD engine/execution stage 110. In an illustrative example implementation, the SIMD control memory 115 may be an M×N memory having M=32 rows and N=64 columns, implementing a SIMD control memory 115 enabling access to 32 SIMD instructions and 64 control outputs, with each location mapped as a control register. In the depicted implementation, each row of the SIMD control memory 115 stores the key control information for the SIMD engine/execution stage 110. Each SIMD instruction decoded by the decode stage 140 may identify one SIMD instruction among N rows of the SIMD control memory 115. The control data 150 stored by the SIMD control memory 115 may be rewritable, increasing instruction set architecture flexibility and reducing the effort and cost to implement customized processor executable program instructions by modifying the control data 150.

Figure 3:
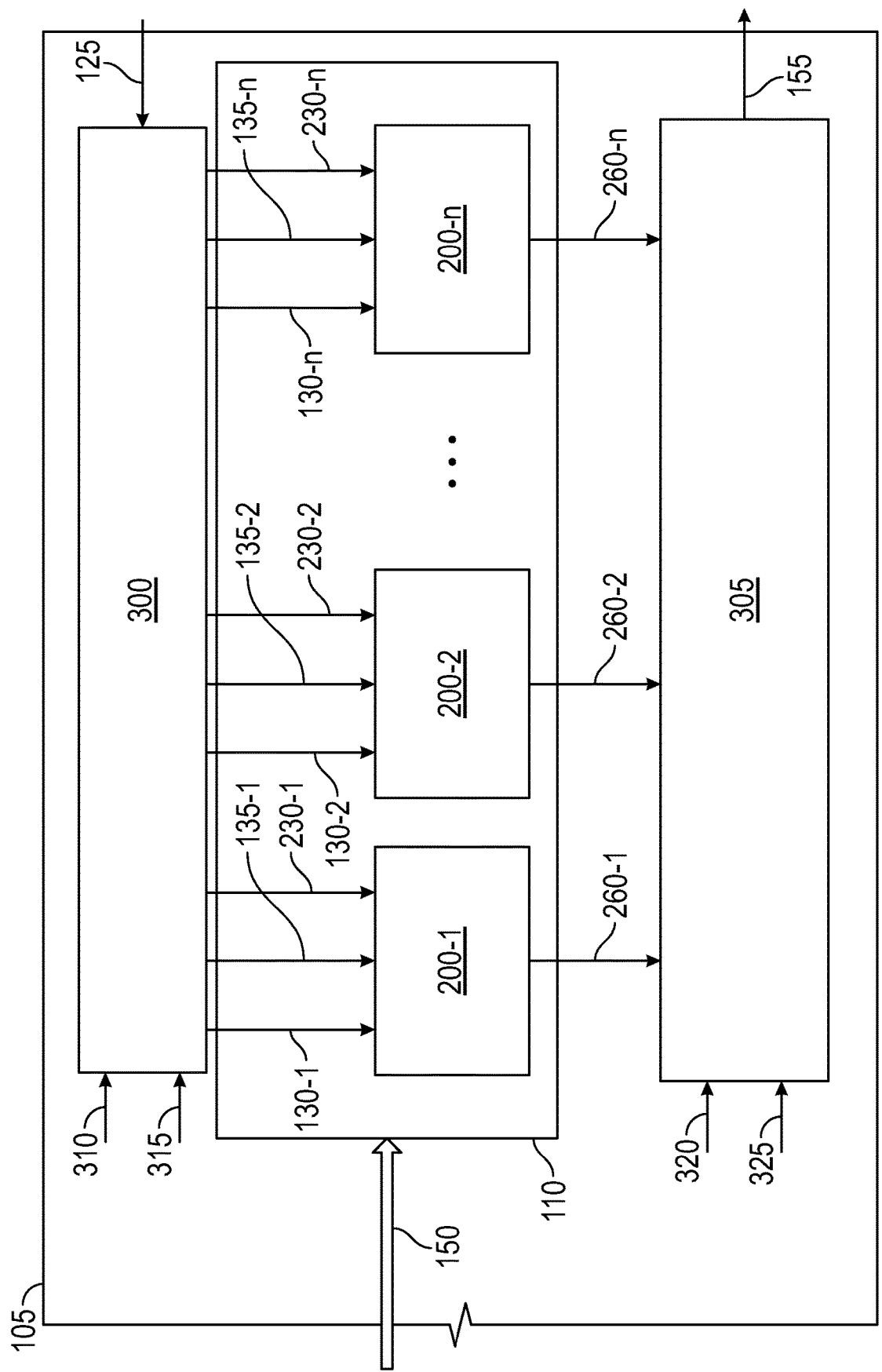
FIG. 3 depicts a block diagram of a portion of an exemplary SIMD processing unit (SPU) implementation.

The SPU 105 may be configured with an operand FIFO to buffer received input (described at least with reference to FIG. 3). The SPU 105 may be configured with an output FIFO to buffer output (described at least with reference to FIG. 3). In an illustrative example, before issuing SIMD on instruction to activate SIMD processing, a programmer must set a read pointer to an operand FIFO memory and a write pointer to an output FIFO memory (described at least with reference to FIG. 3). When a valid SIMD instruction is issued (determined by the decode stage 140) these read pointers and output pointers of each FIFO memory increment to point to the next item, operand, or output.

The SPU 105 may be implemented in combination with a pipelined processor. The pipelined processor integration (described at least with reference to FIG. 4) may comprise one or more regular (not SIMD) execution stage supplemented by an exemplary SIMD engine/execution stage 110 designed in accordance with the present disclosure. The decode stage 140 may be configured with logic designed to permit the one or more traditional execution stage to receive instructions to be executed unless SIMD processing is activated. After SIMD processing is activated in response to the decode stage 140 identifying an instruction as a SIMD on instruction, then instructions are not issued to the regular execution stage in the pipeline until a SIMD off instruction is decoded by the decode stage 140. During SIMD processing the decode stage 140 may extract a SIMD opcode from the instruction. The decode stage 140 may extract a 5-bit opcode from the instruction. The decode stage 140 may output the SIMD opcode as the memory address 145 to address the control data 150 stored in the SIMD control memory 115. In an illustrative example, a 32×64 SIMD control memory 115 using a 5-bit SIMD opcode produces a 64-bit output which is the control signal (control data 150) for the SIMD engine/execution stage 110. In an illustrative example using a 32-bit microprocessor the number of control registers for the SIMD control memory 115 (M×N memory) takes 64 locations. The SPU 105 may comprise multiple individual SIMD processing elements (SPEs) (described at least with reference to FIG. 2) each configured to receive the same control signals from the SIMD control memory 115. In an illustrative example, each individual SPE may be configured to perform an operation selected by the control signals. Each individual SPE may be configured to perform the selected operation on a slice of an input data word. The values in three control registers which store three constant values may be shared by all the SPEs, such that each individual SPE receives identical control signal (described with reference to FIG. 2).

Figure 2:
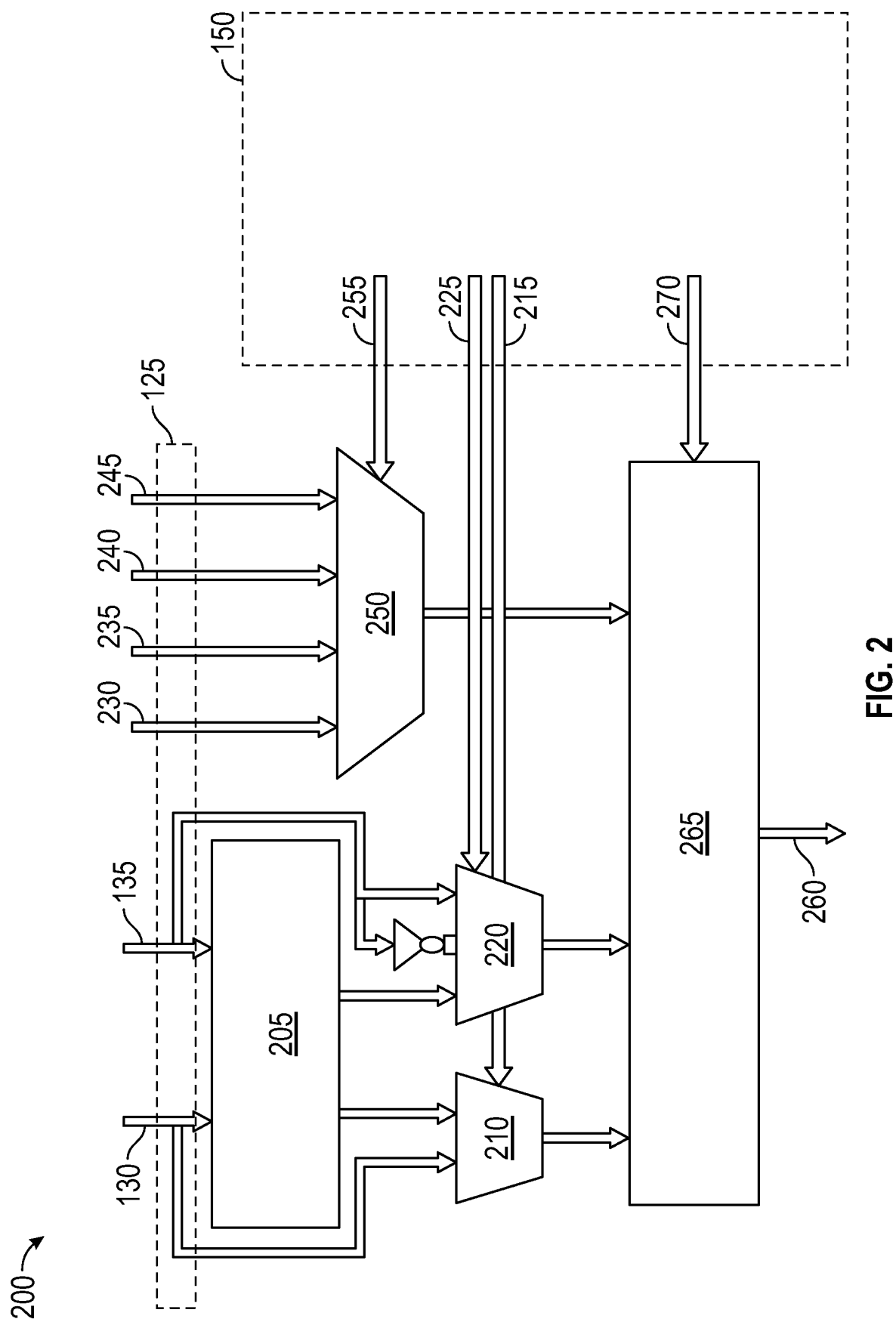
FIG. 2 depicts a block diagram of an exemplary SIMD processing element (SPE) component implementation.

FIG. 2 depicts a block diagram of an exemplary SIMD processing element (SPE) component implementation. In FIG. 2, the exemplary SIMD processing element (SPE) 200 comprises a multiplication and adder block configured to receive input and control signals, perform an ALU operation on the input, where the operation is selected by the control signals, and output the result. The depicted SPE 200 may be one slice of a SIMD execution stage comprising multiple individual SPEs (described at least with reference to FIGS. 1 and 3). In the depicted implementation, the SPE 200 receives input data 125 and control data 150. The control data 150 is received from a SIMD control memory (described at least with reference to FIG. 1). In the depicted implementation, the multiplier 205 is configured to receive the operand A 130 and the operand B 135. In the depicted implementation, the 2:1 multiplexer 210 is controlled by the control signal control C 215 received from the SIMD control memory. In the depicted implementation, the 3:1 multiplexer 220 is controlled by the control signals control B[1:0] 225 received from the SIMD control memory. In the depicted implementation, the operand C 230, variable-1 235, variable-2 240, and variable-3 245 are operably coupled with respective inputs to the 4:1 multiplexer 250. In the depicted implementation, the 4:1 multiplexer 250 is controlled by the control signals control A[1:0] 255 received from the SIMD control memory. In the depicted implementation, the SPE output 260 is determined as a function of the three-input adder 265 using as inputs the outputs of the 2:1 multiplexer 210, the 3:1 multiplexer 220, and the 4:1 multiplexer 250. In the depicted implementation, the three-input adder 265 and the SPE output 260 are controlled by the control signal control D 270 received from the SIMD control memory. In the depicted implementation there are 6-bit controls: control A[1:0] 255, control B[1:0] 225, control C 215, and control D 270. In the depicted implementation the three-input adder 265 produces the SPE output 260. In an illustrative example, assume variable-1 235 is 0, variable-2 240 is the opposite value of operand C 230, and variable-3 245 is −1 in 2's complement, where all bits are 1s. Table 1 shows some examples regarding how to use the SPE 200 computing block depicted by FIG. 2. Note that the multiplier logic produces three numbers after a series of partial product additions, and then these three numbers are added to produce the multiplication result as the final step. The last 3 number adder block may be used for other addition/subtraction operations.

TABLE 1

Example Reconfigurable SIMD Operations

| | Control A | Control B | Control C | Control D |
|---|---|---|---|---|
| A * B + C | 00 (operand C) | 00 (Intermediate Mul Value) | 1 (Intermediate Mul Value) | 0 (0) |
| A * B + Variable 1 | 01 (Var 1) | 00 (Intermediate Mul Value) | 1 (Intermediate Mul Value) | 0 (0) |
| A + B + C | 00 (operand C) | 10 (operand B) | 0 (operand A) | 0 (0) |
| A − B | 01 (Var 1 = 0) | 01 (⁻operand B) | 0 (operand A) | 1 (1) |
| A + B + C + 1 | 00 (operand C) | 10 (operand B) | 0 (operand A) | 1 |
| A * B − C | 10 (Var 2 = ⁻C) | 00 (Intermediate Mul Value) | 1 (Intermediate Mul Value) | 1 |
| A + B − 1 | 11 (Var 1 = 0) | 10 (operand B) | 0 (operand A) | 0 |
| A − B + C | 00 (operand C) | 01 (⁻operand B) | 0 (operand A) | 0 |

Table 1 presents example operations using the exemplary SPE 200 design depicted by FIG. 2. In Table 1, the leftmost column is the SIMD operation, and the top row is the control input to the block. In an illustrative example applying Table 1, then the M×N SIMD control memory 115 (depicted at least by FIG. 1) maps each row to each custom SIMD instruction. The M×N memory may be updated in the supervisor mode only. The system may be configured to prevent data update during normal execution to prevent erratic operations. The SIMD control memory may be updated depending on the applications or algorithms to expedite the overall SIMD performance.

FIG. 3 depicts a block diagram of a portion of an exemplary SIMD processing unit (SPU) implementation. In FIG. 3, the depicted portion of the SPU 105 includes the SIMD engine/execution stage 110. The depicted SIMD engine/execution stage 110 receives the control data 150 from a SIMD control memory, described at least with reference to FIG. 1. In the depicted implementation, the SIMD engine/execution stage 110 is operably coupled to the operand FIFO memory 300 to receive operands. In the depicted implementation, the SIMD engine/execution stage 110 comprises multiple individual SIMD processing element (SPE) blocks 200-1, 200-2, . . . , 200-n. In the depicted implementation, each of the multiple SPE blocks 200-1, 200-2, . . . , 200-n comprise an ALU block (described at least with reference to FIG. 2). In the depicted implementation, the SPE blocks 200-1, 200-2, . . . , 200-n are operably coupled with the operand FIFO memory 300 to respectively receive operand A-1 130-1, A-2 130-2, . . . , A-n 130-n; operand B-1 135-1, B-2 135-2, . . . , B-n 135-n; and operand C-1 230-1, C-2 230-2, . . . , C-n 230-n. In the depicted implementation the operands A-1 130-1, A-2 130-2, . . . , A-n 130-n; B-1 135-1, B-2 135-2, . . . , B-n 135-n; and C-1 230-1, C-2 230-2, . . . , C-n 230-n are received on an input of the operand FIFO memory 300. In the depicted implementation, the respective SPE outputs 260-1, 260-2, . . . , 260-n are operably coupled to the output FIFO memory 305. In the depicted implementation, the SIMD engine/execution stage 110 receives operands from the operand FIFO memory 300. In the depicted implementation, the output of the SIMD engine/execution stage 110 is stored into the output FIFO memory 305. In the depicted implementation, the operand FIFO memory 300 and the output FIFO memory 305 are configured with respective FIFO memory address counters. In the depicted example, the operand FIFO memory 300 address counter is used to implement the operand FIFO memory write pointer 310 and the operand FIFO memory read pointer 315. In the depicted implementation, the output FIFO memory 305 address counter is used to implement the output FIFO memory write pointer 320 and the output FIFO memory read pointer 325. In the depicted implementation, as the SIMD engine/execution stage 110 executes each instruction and moves the address pointer for the operands A-1 130-1, A-2 130-2, . . . , A-n 130-n; B-1 135-1, B-2 135-2, . . . , B-n 135-n; and C-1 230-1, C-2 230-2, . . . , C-n 230-n, the operand FIFO memory 300 address counter and the output FIFO memory 305 address counter increment every clock cycle. In the depicted implementation, the operand FIFO memory 300 and the output FIFO memory 305 each comprise two parts of a memory block. In an illustrative example, while one part of an operand FIFO memory 300 memory block or an output FIFO memory 305 memory block is providing data to the SIMD engine/execution stage 110, the other part of the respective memory block may store data from an external input or from the output FIFO memory 305 buffer. In this example, since the SIMD engine/execution stage 110 is designed to work under a dual thread paradigm, there are two read pointers and write pointers for the operand FIFO memory 300. In some implementations, the operand FIFO memory 300 read pointers and write pointers may be configured per-thread. Each thread may have one operand FIFO memory 300 read pointer and one operand FIFO memory 300 write pointer. In some implementations, the system may be designed to support any number of threads with a corresponding number of read and write pointers. In an illustrative example, the read pointer may be used to feed data to the SIMD engine/execution stage 110. The write pointer may be used to store data from a data bus. In the depicted implementation, the write pointer in output FIFO memory 305 may be used to store data from the SIMD engine/execution stage 110. The read pointer in output FIFO memory 305 may be used to push out data to a data bus.

Figure 4:
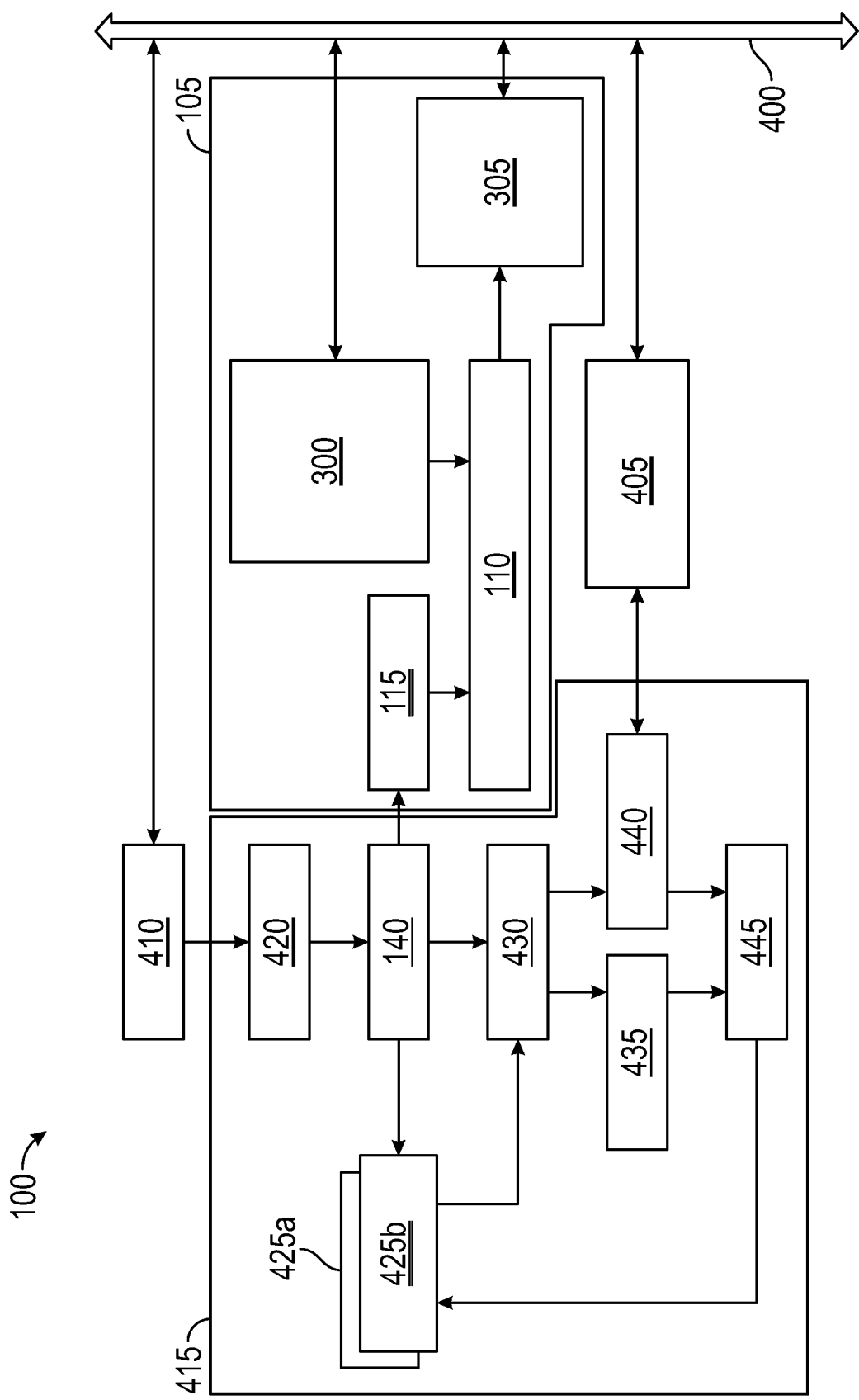
FIG. 4 depicts an exemplary SIMD computing system implementation having a pipelined processor configured with an exemplary SIMD processing unit (SPU) configured to perform a selected operation on a portion of a processor input data word, with the operation selected by control signals read from a control memory location addressed by a decoded instruction, in accordance with the present disclosure.

FIG. 4 depicts an exemplary SIMD computing system implementation having a pipelined processor configured with an exemplary SIMD processing unit (SPU) configured to perform a selected operation on a portion of a processor input data word, with the operation selected by control signals read from a control memory location addressed by a decoded instruction, in accordance with the present disclosure. In FIG. 4, the depicted exemplary SIMD computing system includes the data bus 400, the data memory/data cache 405, and the instruction memory/instruction cache 410 operably coupled with the processor 415. The processor 415 is a pipelined processor comprising the fetch stage 420. The SIMD computing system also includes the SPU 105 comprising the SIMD engine/execution stage 110, the SIMD control memory 115, the operand FIFO memory 300, and the output FIFO memory 305. In the depicted implementation, the operand FIFO memory 300 and the output FIFO memory 305 operably couple the SPU 105 to the data bus 400. In the depicted implementation, the fetch stage 420 is configured to fetch instructions from instruction memory to be executed by the processor 415. In the depicted implementation, the fetch stage 420 is designed to support two threads of programs. The depicted fetch stage 420 is configured with two program counters (PCs) for each of two threads: PC0 for Thread 0, and PC1 for Thread 1. In the depicted fetch stage 420 implementation, when the fetch stage 420 fetches an instruction using PC0, then the next cycle instruction is based on PC1. In this example, Thread0 brings instructions to the fetch stage 420 every other cycle. Thread 1 also brings instructions to the fetch stage 420 every other cycle. Thus, instructions in the fetch stage 420 are interleaving between Thread0 and Thread1. In the depicted implementation, there are two sets of register files, register file A 425*a*, and register file B 425*b*, to support dual thread operations. In the depicted implementation, each thread, Thread0 and Thread1, have their own register file. In the depicted implementation, the decode stage 140 (described at least with reference to FIG. 1) disassembles each instruction and prepares operands and control signals for either the SIMD engine/execution stage 110 or the regular execution stages (execute stage one 430 and execute stage two 435) depending on whether SIMD processing is activated. In the depicted implementation, the execution stages are configured to perform ALU operations and produce results. The load/store stage 440 produces a memory address to access data memory. The writeback stage 445 stage updates the register file using data from the execution stages or the load/store stage 440. In the depicted implementation, each stage may be separated by flip-flops (FF). In an illustrative example, data may be stored into FF, and the following stage may read the stored data from the FF.

Although various features have been described with reference to the Drawings, other features are possible.

In illustrative examples, a SIMD engine may be designed to split a larger data field to accommodate multiple data in smaller slices. For example, a 64-bit data word in a microprocessor may be used to accommodate 8 or 4 8-bit data operands, and masking operations may be applied to make adjustments between operations. SIMD may be implemented as a special engine either as a separate external unit (outside of silicon) or as an internal engine (on the same silicon) depending on applications. Each array of such a special ALU may execute the same instruction with different operands supplied by an internal data buffer or a special memory. Each ALU may have a fixed data width (from 8 to 64-bit wide) and the number of ALUs may determine the data throughput. As applications such as machine learning and artificial intelligence become popular, the data granularity requirement is varying, for example, from 3-bit to 32-bit wide, depending on computing time requirements or accuracy requirements for a learning/prediction model.

In illustrative examples, a SIMD engine may provide very high data throughput compared to a regular microprocessor. Such an exemplary SIMD engine may be configured to have capability to perform multiple ALU operations in single clock cycle. Also, data may be provided and stored into FIFO memory. These data movements may be implemented by system level memory operations or DMA types of data operations. If these data are moved into a register file and stored into memory after computation, then many computing cycles of a microprocessor will be used.

In illustrative examples, an exemplary SIMD engine may spend one or two cycles per each given instruction. For a given functional routine, a series of instructions are executed to complete that routine. Although the internal micro-architecture can support some routines using a smaller number of cycles, execution may require more cycles due to the lack of desired instructions to control the micro architecture. For example, consider a hypothetical case wherein an operation A+B+1 needs to be implemented. Usually, such an operation may be implemented using two instruction steps such as C=A+B and D=C+1. The first step can be done by an ADD instruction, and the second step can be implemented by adding the result of the previous and immediate value 1 or using an increment instruction. Although many microprocessors can support such a task in a single cycle, such operations cannot be performed in a single cycle if there is no such instruction.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale and features of one implementation may be employed with other implementations as the skilled artisan would recognize, even if not explicitly stated herein. Descriptions of well-known components and processing techniques may be omitted so as to not unnecessarily obscure the implementation features.

Elements described herein as coupled or connected may have an effectual relationship realizable by a direct connection or indirectly with one or more other intervening elements.

In the present disclosure, the term "any" may be understood as designating any number of the respective elements, that is, as designating one, at least one, at least two, each or all of the respective elements. Similarly, the term "any" may be understood as designating any collection(s) of the respective elements, that is, as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. Use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, all descriptions where "comprising" is used may have as alternatives "consisting essentially of," or "consisting of." In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

Throughout this disclosure and elsewhere, block diagrams or flowchart illustrations may depict methods, apparatuses (i.e., systems), and computer program products. Each element of the block diagrams or flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional programs or programmable apparatuses that run them. It is contemplated, for example, that implementations of the disclosure as claimed herein could include an optical computer, quantum computer, analog computer, or the like.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer or network systems over numerous topologies. Within this field, the configuration and management of large systems includes storage devices and computers that are communicatively coupled to dissimilar computers and storage devices over a network, such as the Internet.

The respective reference numbers and descriptions of the elements depicted by the Drawings are summarized as follows.

100 reconfigurable single instruction multiple data (SIMD) computing system
105 SIMD processing unit (SPU)
110 SIMD engine/execution stage
115 SIMD control memory
120 instructions
125 input data
130 operand A
130-*n* operand A-n
135 operand B
135-*n* operand B-n
140 decode stage
145 memory address
150 control data
155 SIMD engine/execution stage output data
200 SIMD processing element (SPE)
200-*n* SPE-n
205 multiplier
210 2:1 multiplexer
215 control C
220 3:1 multiplexer
225 control B[1:0]
230 operand C
230-*n* operand C-n
235 variable 1
240 variable 2
245 variable 3
250 4:1 multiplexer
255 control A[1:0]
260 SPE output
260-*n* SPE output-n
265 three-input adder
270 control D
300 operand FIFO memory
305 output FIFO memory
310 operand FIFO memory write pointer
315 operand FIFO memory read pointer
320 output FIFO memory write pointer
325 output FIFO memory read pointer
400 data bus
405 data memory/data cache
410 instruction memory/instruction cache
415 processor
420 fetch stage
425*a* register file A
425*b* register file B
430 execute stage one
435 execute stage two
440 load/store stage
445 writeback stage A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus comprising:
an instruction memory storing a sequence of executable instructions, the executable instructions comprising a mixture of single instruction multiple data (SIMD) executable instructions containing multiple operands, and executable instructions containing single operands;
a fetch stage retrieving an executable instruction from the instruction memory;
a decode stage configured to receive the executable instruction from the fetch stage, the decode stage identifying and separating data operands;
the decode stage coupled to an output of the fetch stage and transmitting the executable instructions containing the single operand to an execution stage for processing and transmitting the executable instructions containing multiple operands to at least one SIMD processing element (SPE) for processing, the decode stage also providing control signals associated with the executable instructions containing multiple operands to a control memory;
the at least one SPE operably coupled to the control memory to receive from the control memory at least one SPE control signal stored by the control memory, wherein the at least one SPE is configured to perform a selected operation on a portion of a data word, and wherein the selected operation is determined as a function of the at least one SPE control signal read from the control memory.

2. The apparatus of claim 1, wherein the portion of the data word further comprises at least one operand, and the at least one SPE is configured to perform the selected operation on at least the at least one operand.

3. The apparatus of claim 1, wherein the portion of the data word further comprises at least one variable, and the at least one SPE is configured to perform the selected operation on at least the at least one variable.

4. The apparatus of claim 1, wherein the control memory further comprises a plurality of memory locations, and wherein at least one SPE control signal is stored in at least one memory location of the plurality of memory locations.

5. The apparatus of claim 1, wherein the selected operation further comprises an arithmetic logic unit (ALU) operation.

6. The apparatus of claim 1, wherein the at least one SPE further comprises a plurality of SPEs.

7. The apparatus of claim 6, wherein the apparatus further comprises each SPE of the plurality of SPEs is configured to receive identical SPE control signals.

8. The apparatus of claim 1, wherein the at least one SPE control signal received by the at least one SPE from the control memory is read from a control memory location addressed as a function of a decoded instruction.

9. The apparatus of claim 1, wherein the apparatus further comprises a pipelined processor having the decode stage operably coupled with the control memory, wherein the decode stage is configured to decode an instruction received from the pipelined processor and output to the control memory a control memory address based on the decoded instruction, wherein the control memory address comprises an address of a control memory location storing at least one SPE control signal, and wherein the control memory is configured to output to the at least one SPE the at least one SPE control signal addressed in the control memory by the decoded instruction.

10. An apparatus comprising:
an instruction memory storing a sequence of executable instructions, the executable instructions comprising a mixture of single instruction multiple data (SIMD) executable instructions containing multiple operands, and executable instructions containing single operands;
a fetch stage retrieving an executable instruction from the instruction memory;
a decode stage configured to receive the executable instruction from the fetch stage, the decode stage identifying and separating data operands and generating control signals;
the decode stage transmitting the single operand instructions to an execution stage for processing;
a SIMD engine comprising a plurality of SIMD processing elements (SPEs), wherein each SPE of the plurality of SPEs comprises a data input receiving multiple operands from the decode stage, a control input receiving control signals from the decode stage, and a data output, wherein each SPE is configured to provide on the data output a result of a selected arithmetic logic unit (ALU) operation on the data input, and wherein the selected ALU operation is determined as a function of the control input;
a control memory having an address input and a data output, wherein the address input is operably coupled with a decode stage of a pipelined processor to receive an address determined as a function of an instruction decoded by the decode stage, wherein the control memory data output is operably coupled with the control inputs of the plurality of SPEs to provide a plurality of SPE control signals read from the control memory to the control inputs of the plurality of SPEs;
an input FIFO having a plurality of inputs configured to receive data and a plurality of outputs operably coupled with the data inputs of the plurality of SPEs; and
an output FIFO having a plurality of inputs operably coupled with the data outputs of the plurality of SPEs, wherein the output FIFO has an output configured to provide an output of the SIMD engine determined as a function of individual results output by the plurality of SPEs.

11. The apparatus of claim 10, wherein at least one SPE of the plurality of SPEs further comprises an adder and the selected ALU operation further comprises addition.

12. The apparatus of claim 10, wherein at least one SPE of the plurality of SPEs further comprises a multiplier and the selected ALU operation further comprises multiplication.

13. The apparatus of claim 10, wherein at least one SPE of the plurality of SPEs further comprises a multiplication and adder block having a plurality of operand inputs and at least one output, wherein the multiplication and adder block is configured to provide on the at least one output a result determined by at least one multiplexer based on at least one SPE control signal from the control memory operably coupled with the at least one multiplexer.

14. The apparatus of claim 10, wherein the apparatus further comprises the decode stage is configured to determine if an instruction is a SIMD instruction.

15. The apparatus of claim 14, wherein the decode stage further comprises logic configured to enable the control memory to output at least one SPE control signal to at least one SPE input in response to a determination the instruction is a SIMD instruction.

16. The apparatus of claim 10, wherein the decode stage further comprises logic configured to enable decoding SIMD instructions in response to decoding a SIMD on instruction.

17. An apparatus comprising:
a SIMD engine comprising a plurality of SIMD processing elements (SPEs), wherein each SPE of the plurality of SPEs comprises an SPE data input, an SPE control input, and an SPE data output, wherein each SPE is configured to provide on the SPE data output a respective result of a respective selected arithmetic logic unit (ALU) operation on the SPE data input, and wherein the selected ALU operation of each said SPE is determined as a function of the SPE control input;
a rewriteable control memory having an address input and a data output, wherein the address input is operably coupled with a decode stage of a pipelined processor to receive an address determined as a function of an instruction decoded by the decode stage, wherein the control memory data output is operably coupled with the SPE control inputs of the plurality of SPEs to provide a plurality of SPE control signals read from the control memory to the SPE control inputs of the plurality of SPEs, and wherein the control memory is an M×N control memory having M rows and N columns configured to retrievably store M possible SIMD operations and N SPE control signals;
an input FIFO having a plurality of inputs configured to receive data comprising a plurality of operands, wherein the input FIFO has a plurality of outputs operably coupled with the SPE data inputs of the plurality of SPEs, wherein the input FIFO has a plurality of per-thread read pointers and a plurality of per-thread write pointers, and wherein the input FIFO read pointers and the input FIFO write pointers are modifiable by processor executable instructions; and
an output FIFO having a plurality of inputs operably coupled with the SPE data outputs of the plurality of SPEs, wherein the output FIFO has a plurality of per-thread read pointers and a plurality of per-thread write pointers, and wherein the output FIFO read pointers and the output FIFO write pointers are modifiable by processor executable instructions, and wherein the output FIFO has an output configured to provide an output of the SIMD engine determined as a function of individual results output by the plurality of SPEs.

18. The apparatus of claim 17, wherein the SIMD engine is internal to the pipelined processor.

19. The apparatus of claim 17, wherein the SIMD engine is external to the pipelined processor.

20. The apparatus of claim 17, wherein the pipelined processor further comprises a RISCV superscalar processor.

* * * * *